United States Patent [19]

Kolchinsky et al.

[11] Patent Number: 4,540,154

[45] Date of Patent: Sep. 10, 1985

[54] SOLENOID VALVE

[75] Inventors: Abel E. Kolchinsky, Glenview; Shaukat Kazi, Chicago, both of Ill.

[73] Assignee: Imperial Clevite Inc., Glenview, Ill.

[21] Appl. No.: 680,419

[22] Filed: Dec. 11, 1984

Related U.S. Application Data

[63] Continuation of Ser. No. 392,382, Jun. 28, 1982, abandoned.

[51] Int. Cl.³ .............................................. F16K 31/02
[52] U.S. Cl. .................... 251/129.15; 137/315; 411/531; 411/546; 335/261; 335/278
[58] Field of Search .............. 251/129; 137/315; 411/531; 335/255, 261, 278, 281

[56] References Cited

U.S. PATENT DOCUMENTS

| | | | |
|---|---|---|---|
| 951,766 | 3/1910 | Coffin | 411/546 |
| 2,383,411 | 8/1945 | Obszarny | 335/261 |
| 3,082,359 | 3/1963 | Margiofico et al. | 335/261 |
| 4,055,823 | 10/1977 | Anderson | 335/278 X |
| 4,341,241 | 7/1982 | Boher | 251/129 X |

Primary Examiner—Alan Cohan
Assistant Examiner—John C. Fox
Attorney, Agent, or Firm—Russell E. Baumann

[57] ABSTRACT

A cartridge solenoid poppet valve (10) arranged to use a single size pilot valve (31) with any one of a set of a plurality of different size sets of valve seat members (14) and poppet valves (24). Pilot guides (175) are provided having different transverse extents to accommodate such different size valve members. The valve further includes a flatted pilot guide (32) defining flow passages communicated between a transfer chamber (35) and a pilot valve chamber (30) in which the pilot valve (31) is disposed. A T-slot (58) is provided in the solenoid plunger (38) extending fully diametrically thereacross and the pilot valve includes a T-shaped connecting head (71) received therein. The plunger (38) and plug (41) define cooperating stop surfaces (67,70) for maintaining a small spacing between the plunger and plug at all times. Solenoid structure (53) includes a parallelepiped frame (46) defining a space with the solenoid coil (44) received therein. The portion of the coil space not occupied by the coil is filled with a set synthetic resin. The structure includes a nut (52) threaded to a connecting portion (79) of a plug (41) to bear forcibly against a flange (51) on a washer (50) urging the washer axially outwardly against the solenoid frame (46) and thereby urging the frame outwardly against an adapter (11) arranged to be threaded to a port (73). The outer housing (49) is a configuration generally similar to the external configuration of the frame.

8 Claims, 6 Drawing Figures

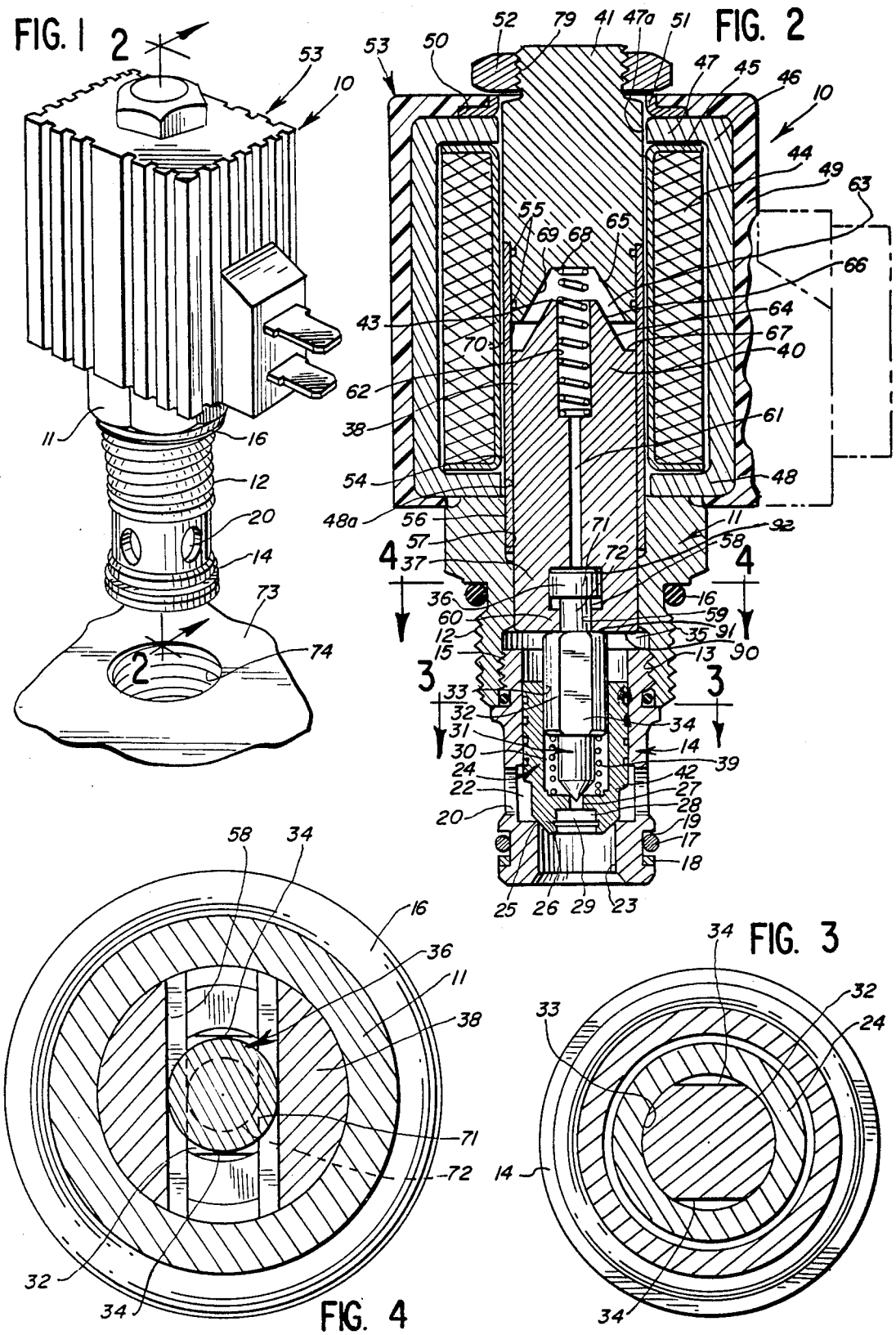

SOLENOID VALVE

This is a continuation of application Ser. No. 392,382 filed June 28, 1982, now abandoned.

BACKGROUND OF THE INVENTION

1. Field of the Invention

This invention relates to valves and in particular to solenoid-operated cartridge valves.

2. Description of the Prior Art

In one form of fluid flow control valve, a poppet is seated against a valve seat to close the valve. The poppet is provided with a through bore which is selectively closed by a pilot valve. The poppet is spring-biased to the closed position with fluid pressure acting on opposite sides of the poppet so as to permit the spring biasing to maintain the poppet closed. When the pilot valve is raised from the valve seat, the fluid pressure behind the poppet is relieved to the through bore, thus permitting the fluid pressure acting upwardly on the poppet to move the poppet from the valve seat and thereby permit flow through the valve.

In one form, the pilot valve is operated by a suitable solenoid having a plunger connected to the pilot valve for selective positioning thereof in effecting the desired fluid flow control.

Such valves are provided in a wide range of sizes depending on the flow capacity desired.

It is further conventional to provide such valves in the form of cartridges, including both the valve and the solenoid operator in a single assembly which, illustratively, may be connected to suitable ports by a threaded adapter portion thereof.

In U.S. Pat. No. 2,951,133 of James E. Davies et al., a hermetically sealed electromagnetic contactor and the like is disclosed wherein a drawn metal member is provided with a central opening through its upper end, which is encircled by an upstanding flange portion extending through an opening in a superjacent cup-shaped housing member.

Arthur J. Foley et al., in U.S. Pat. No. 3,215,902, show a solenoid actuated mechanism wherein the electrical assembly is located between a flux plate and an upper flux plate, with central apertures of the three elements being aligned and mounted upon a cylindrical protruding portion of the core support.

In U.S. Pat. No. 3,446,473, George E. Barker shows a solenoid valve wherein the solenoid housing is threaded to the valve body.

Alfred J. Ludwig, in U.S. Pat. No. 3,593,241, discloses a solenoid valve having a slotted flux sleeve for nesting the winding leads. The magnetic flux path includes a portion established by a pair of magnetizable end members disposed adjacent the opposite end surfaces of the solenoid coil, with a magnetizable center leg defining the end plug.

In U.S. Pat. No. 3,818,398, William J. Barbier et al. disclose an electromagnetic coil assembly wherein a T-shaped tubular shroud formed of ferrous material is press-fitted into each end of the spool supporting the solenoid coil.

In U.S. Pat. No. 4,074,700 of Thomas H. Engle, a valve assembly is disclosed wherein the coil housing provides a flux return path extending toriodally from the coil through an upper portion of a plunger guide, through the plunger, across a working air gap, through a pole piece, through a coil support flange, and up through a coil housing. The coil housing includes an axially extending lip which is sized diametrically to fit closely to the plunger and axially to provide an increased area for flux transfer. The plunger guide is made as thin as practical so that magnetic losses are minimized.

SUMMARY OF THE INVENTION

The present invention comprehends an improved performance and economy of manufacture.

The invention comprehends the provision in a fluid flow control valve having a movable valve member of an improved solenoid structure selectively positioning the valve member.

More specifically, the invention comprehends such an improved solenoid structure including an annular coil, means defining frame elements each having a sidewall and inturned end walls defining an inwardly opening recess, the recesses opening toward each other, the coil being disposed in the recesses, a guide tube coaxially of the coil, a magnetic plunger slidable axially within the guide tube and radially within the coil connected to the valve, an adapter having an axially inwardly facing surface abutting the inturned end walls at an outer end of the frame means, a securing element, plug means extending inwardly from the inner end of the guide and having an axially inner end projecting through the annular element and defining an external connecting portion, and a housing enclosing the assembled structure, the securing element being secured to the connecting portion to bear forcibly against the annular element and urge the annular element axially outwardly against the frame means, and the frame means against the adapter surface to lock the structure in coaxially assembled relationship.

The housing, in the illustrated embodiment, is molded of a synthetic resin and extends peripherally about the abutment of the adapter surface and inturned end walls at the outer end of the frame elements.

The inturned ends of the frame elements, in the illustrated embodiment, are spaced apart a distance substantially equal to the other diameter of the guide tube.

In the illustrated embodiment, the guide tube is brazed to the plug means and to the adapter.

More specifically, the invention comprehends the provision of such a solenoid structure including an annular coil, a pair of opposed spaced frame elements each having a substantially planar sidewall and inturned end walls defining an inwardly opening C-section, said C-sections opening toward each other, the coil being centered therebetween to extend axially parallel to the sidewalls, a guide tube coaxially with the coil, a magnetic plunger slidable axially within the guide tube and being connected to the valve, an adapter having an axially inwardly projecting annular boss abutting the inturned end walls at an outer end of the frame elements, an annular washer abutting the inturned end walls at the other end of the frame elements, and having an annular axially inturned, radially inner flange, a nut, threaded plug means secured to the inner end of the guide tube and having an axially inner end projecting through the washer and defining an externally threaded connecting portion, the nut being threaded to the connecting portion to bear forcibly against the flange and urge the washer axially outwardly against the adapter boss to lock the structure is coaxially assembled relationship, and a housing enclosing the assembled structure.

In the illustrated embodiment, the frames define axially inwardly opening parallelepiped spaces, with the portions of the spaces unoccupied by the coil being filled with a set synthetic resin.

In the illustrated embodiment, the housing comprises a parallelepiped housing generally similar to the external configuration defined by the spaced frame elements.

The fluid flow control valve solenoid structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a cartridge valve embodying the invention;

FIG. 2 is an enlarged diametric section thereof;

FIG. 3 is a transverse section taken substantially along the line 3—3 of FIG. 2;

FIG. 4 is a transverse section taken substantially along the line 4—4 of FIG. 2;

DESCRIPTION OF THE PREFERRED EMBODIMENT

Figure 5:
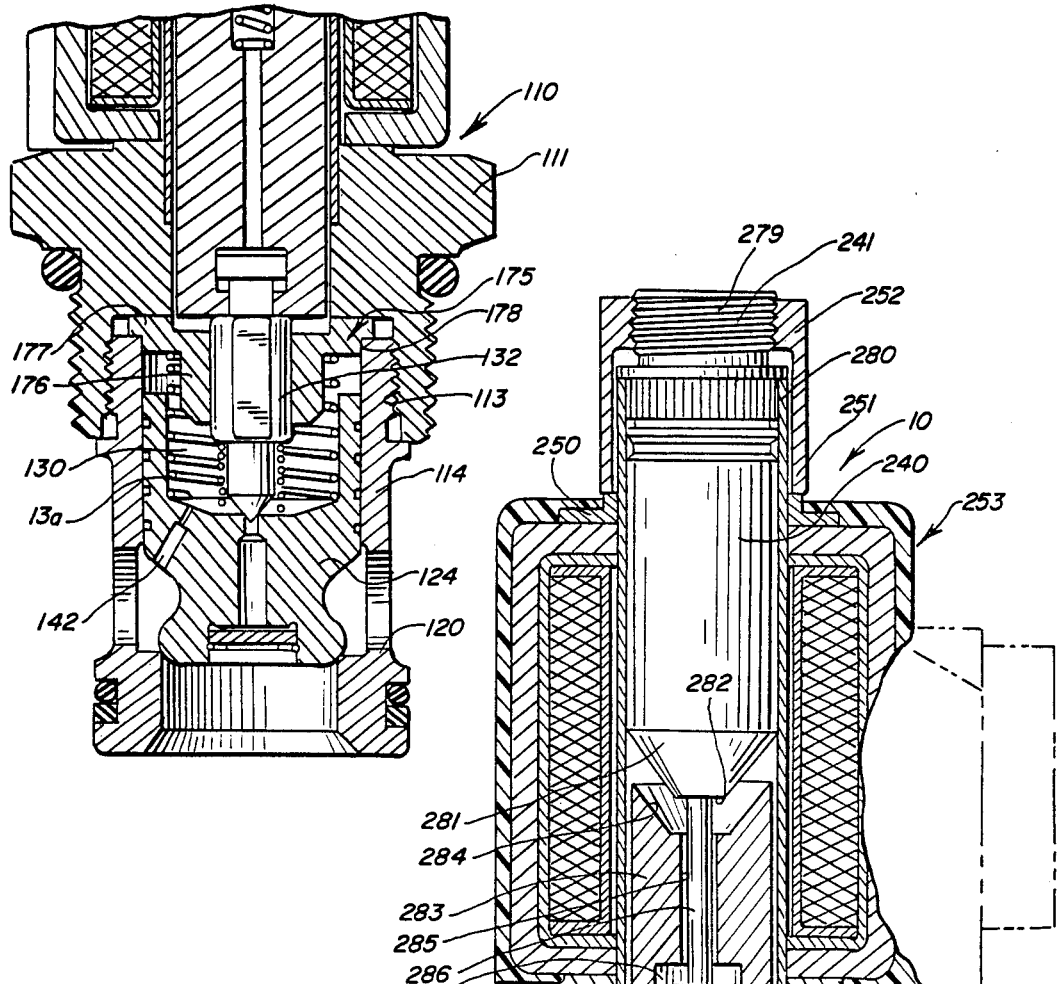
FIG. 5 is a diametric section of a modified form of cartridge form embodying the invention having a pilot guide adapted for use with different size poppet and seat members.

In the illustrative embodiment of the invention as disclosed in the drawing, a cartridge solenoid poppet valve generally designated 10 includes an adapter 11 having a threaded portion 12 adapted to be threaded into a fluid port. The adapter includes a threaded end 13. A seat member 14 is provided with a threaded end 15 threaded to the adapter end 13 so as to be received within the fluid port.

A first sealing ring 16 is provided on the adapter and a second sealing ring 17 is provided on the seat member for sealing the valve assembly within the fluid port.

As shown in FIG. 2, a backup ring 18 may be associated with the sealing ring 17 in a suitable outwardly opening, annular recess 19 of the seat member.

The seat member is provided with a pair of diametrically opposite inlet openings 20 and 21, which open radially inwardly into a valve chamber 22 within the seat member. An outlet opening 23 opens axially from the valve chamber 22 and is normally closed by a valve member 24 seating on an annular seat 25 of the seat member at the inner end of the outlet port 23.

Thus, when installed in a suitable port member, fluid pressure between seals 16 and 17 is applied through the inlet ports 20 and 21 against the valve member 24. In the illustrated embodiment, valve member 24 comprises a poppet valve having a lower seating portion 26 engaging the valve seat 25 and provided with an axial bore 27 having an outer counterbore 28 receiving a check valve 29. The check valve prevents fluid pressure in the outlet port 23 from causing a reverse flow through the bore 27 into a pilot valve chamber 30 within the valve member 24.

Bore 27 is normally closed by a pilot valve 31 having a guide portion 32 slidably received in an upper cylindrical recess 33 of the valve member 24. The slide portion 32 is provided with a pair of diametrically opposite flats 34 for providing fluid communication between a transfer chamber 35 and the pilot valve chamber 30.

Slide portion 32 acts as a pilot guide and defines an upper end 36 abutting a lower end 37 of a solenoid plunger 38 in the normally closed arrangement of the valve. A helical coil spring 39 extends between the guide portion 32 and the seating portion 26 of valve member 24 to bias the poppet valve downwardly relative to the guide portion 32. As shown in FIG. 2, however, when plunger 38 is in the lowermost position with portion 37 thereof abutting the upper end 36 of the pilot guide portion 34, the plunger urges both the pilot valve and the poppet valve 24 downwardly into the seated arrangements of FIG. 2.

In the normally closed arrangements of the solenoid valve 10, the plunger is biased downwardly by a helical coil spring 43 acting between an upper end portion 40 of the plunger and a plug 41. Spring 43 has a strength greater than spring 39 and, thus, overcomes the spring 39 to arrange the valve components in the normally closed position of FIG. 2.

As further illustrated in FIG. 2, valve member 24 is provided with a bleed passage 42 providing communication between the inlet 20 and the pilot valve chamber 30 at all times. Thus, in the normally closed position wherein the pilot valve 31 is closing the pilot opening 27, fluid pressure at the inlet openings 20 is transmitted through the bleed passage 42 into the pilot valve chamber 30 and acts to maintain the poppet valve member 24 in the closed position illustrated in FIG. 2, in cooperation with the springs 43 and 39.

Pilot valve 31 is moved from the seated position illustrated in FIG. 2 by suitable longitudinal movement of plunger 38 toward plug 41 under the control of a solenoid coil 44. In the illustrated embodiment, the coil 44 is carried in a suitable bobbin 45 mounted within a generally tubular frame 46 having a first, inner end 47 and a second, opposite outer end 48. The frame is encapsulated in an outer housing 49 which may be formed of a suitable synthetic resin. The space within the frame receiving the coil is filled with a suitable synthetic resin, such as an epoxy resin.

A washer 50 is provided in the housing surrounding the upper end of plug 41, and is provided with an axially turned inner end portion 51 extending outwardly to the outer surface of the housing to be engaged by a nut 52 threaded to the distal threaded end 53 of the plug 41.

End 48 of the frame abuts the adapter 11 radially inwardly of the housing 49 and, thus, nut 52 acting through washer 50 and frame 46 effectively clamps the solenoid structure, generally designated 53, to the adapter.

As further illustrated in FIG. 2, a slide tube 54 is secured to the plug 41 as by brazing 55 to extend inwardly of the bobbin 45 and includes a lower end portion 56 received in a suitable recess 57 in the adapter 11. Plunger 38 is reciprocably slidable in the tube 54 between the normally closed position of the valve illustrated in FIG. 2, and an open position of the valve wherein the plunger is raised into abutment with plug 41.

Upper end 36 of pilot valve 31 defines a cylindrical head received in a T section transverse slot 58 provided in the lower end 37 of the plunger 38. The stem portion 59 of the slot is relatively short so as to provide high strength in the end portion 60 of plunger 38 confronting the transfer chamber 35.

A fluid flow passage 61 extends from the T-slot upwardly to a recess 62 receiving coil spring 43 and opening to the space 63 between the upper end surface 64 of plunger 38 and the lower end surface 65 of plug 41.

Illustrated in FIG. 2, surface 64 of the plunger is defined by a radially inner frustoconical portion 66 and a radially outer annular planar portion 67. Surface 65, in turn, is defined by a planar radially inner portion 68, a frustoconical midportion 69 and an annular planar outer portion 70.

The lenngth of frustoconical surface portion 66 is made to be slightly less than the length of frustoconical surface portion 69 of plug 41 so that when the plunger is moved inwardly upon energization of the coil 44, surface 67 of the plunger abuts surface 70 of the plug, with the plunger remaining spaced from the planar surface 68 of the plug, thereby to avoid entrapment of fluid in the space 63 upon energization of the solenoid.

Fluid may flow easily from space 63 upon such energization of the solenoid downwardly through recess 62 and passage 61 into T-slot 58. End portion 36 of the pilot valve includes a cylindrical head portion 71 and a reduced diameter cylindrical stem portion 72 connected to the slidable guide portion 32 of the pilot valve. Stem portion 72 has clearance with the plunger portion 60 within the stem portion 59 of the T-slot so that fluid may flow freely downwardly past the stem portion 72 of the pilot valve end portion into the transfer chamber 35.

As indicated above, the slidable guide portion 32 of the pilot valve is provided with at least a pair of diametrically opposite flats 34 defining flow passages for permitting flow of the entrapped fluid outwardly therethrough into the pilot valve chamber 30 for delivery with the fluid flowing through the valve in the open condition of the valve.

By maintaining the plunger spaced from end surface 68 at all times, entrapment of fluid between the plunger and plug is effectively prevented. By providing the improved fluid flow passages, including the diametrically extending T-slot and the flats on the guide portion 32 of the pilot valve, improved free movement of the pilot valve is provided for improved functioning of the valve structure 10.

The solenoid valve 10 is adapted, as indicated above, to be mounted to a port, such as port 73 illustrated in FIG. 1, having a threaded opening 74 to which threaded portion 12 of the adapter 11 is threaded, with the seat member 14 disposed innermost within the port opening. As indicated above, sealing ring 16 seals the valve to the port about the opening 74 and the O-ring 17 seals the seat member to the port within the opening to provide a sealed fluid passage through the valve within the port.

As illustrated in FIG. 5, the invention further comprehends the provision of a modified form of poppet valve generally designated 110 similar to poppet valve 10 but wherein the pilot valve guide portion 132 is slidably received in a pilot guide 175 clamped between the seat member 114 and the adapter 111.

Thus, as more specifically illustrated in FIG. 5, pilot guide 175 includes a radially inner portion 176 slidably receiving the pilot valve guide portion 132, and an annular outturned portion 177 defining a radially and axially outwardly opening annular corner recess 178 seating against the inner end of the seat member 114 when the seat member is threaded fully into the adapter threaded end 113.

As shown in FIG. 5, the pilot valve spring 139 extends between the outturned portion 177 of the pilot guide and the outer end of the poppet valve member 124.

The pilot valve member is provided with a bleed passage 142 providing communication at all times between the inlet 120 and the pilot valve chamber 130.

The combination of the pilot guide 111, poppet valve member 124 and seat member 114 illustrated in FIG. 5 comprises one set of a plurality of different size cooperating sets of such adapters, poppet valve members and seat members each having the same pilot valve seat configuration so that the same pilot valve structure may be used with a line of valves differing only in the flow capacity provided by the different size poppet valves and seat members. Thus, the pilot guides may be adapted for such a wide range of valve capacities by varying the radial extent of the outturned portion 177 to mate with the selected seat member 114 and complementary valve member 124.

Other than for the use of the pilot guide 175 providing for adaption of the solenoid valve structure to a wide range of different size fluid control valves utilizing the same pilot valve configuration, poppet valve structure 110 is similar to poppet valve structure 10 and functions in a similar manner.

Figure 6:
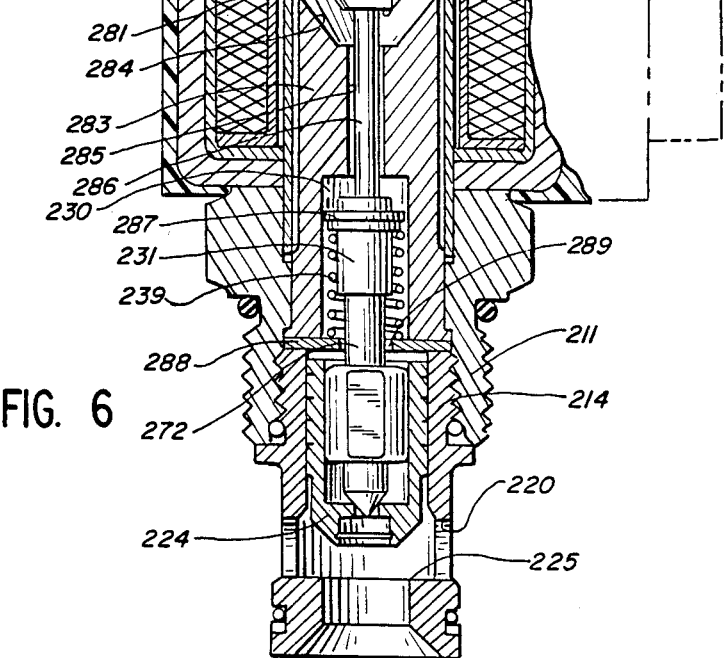
FIG. 6 is a diametric section of a cartridge valve generally similar to the cartridge valve of FIGS. 1–5, but arranged for normally open operation.

Referring now to the embodiment of FIG. 6, a poppet valve generally similar to poppet valve 10 but arranged to function in a normally open manner, is shown to comprise a poppet valve structure generally designated 210. The solenoid structure 253 is generally similar to solenoid structure 53 except that a threaded cap 252 is provided on the threaded end 279 of the plug 241 fitting to a projecting end 280 of slide tube 254.

The plunger 240 is slidably received in the slide tube within the solenoid structure 253. The plunger defines an outer frustoconical end 281 having a planar distal end surface 282. A pilot housing 283 is retained coaxially within the outer end of the slide tube and defines a frustoconical recess 284 complementary to the frustoconical end 281 of the plunger.

The pilot housing further defines a through bore 285 opening outwardly into the pilot chamber 230.

Pilot valve 231 includes an inwardly projecting rod 286 which extends inwardly into abutment with the plunger surface 282, as shown in FIG. 5.

The pilot valve further defines an annular flange 287. A pilot valve biasing spring 239 is seated inwardly against flange 287 and outwardly against a spring retainer plate 288 clamped between the seat member 214 threaded to the adapter 211.

The pilot valve stem 272 extends outwardly through a suitable opening 289 in the spring retainer plate.

Spring 239 normally biases the pilot valve inwardly permitting fluid pressure from inlet openings 220 to urge the poppet valve 224 from the valve seat 225. However, when solenoid structure 253 is energized, the plunger 240 is urged outwardly moving the pilot valve rod 286 outwardly and thereby urging the pilot valve outwardly against the poppet valve 244 so as to move the poppet valve into seated relationship with valve seat 225, thereby closing the valve.

Thus, the normally open valve structure 210 is similar to the normally closed valve structure except for the rearrangement of the parts to provide the normally open functioning.

As discussed above, each of valve structures 110 and 210 is generally similar in structure and functioning to valve structure 10 and similar elements thereof are identified by similar reference numerals except for being 100 and 200 higher, respectively.

The foregoing disclosure of specific embodiments is illustrative of the broad inventive concepts comprehended by the invention.

We claim:

1. In a fluid flow control valve having a valve body and a movable valve member, solenoid structure for selectively positioning the valve member comprising:

an annular coil;

a tubular, rigid, one-piece frame having a sidewall and substantially planar parallel inner and outer end walls defining a coil space, the coil being centered therebetween to extend axially parallel to the sidewall;

a guide tube coaxially within said coil and having a portion spaced radially of and confronting said outer end wall;

a magnetic plunger slidable axially within said guide tube and being connected to said valve;

an adapter removably secured to the valve body and having an axially inwardly projecting annular boss abutting the frame outer end wall;

an annular washer abutting the frame inner end wall and having an annular axially inturned, radially inner flange;

a nut;

threaded plug means secured to the inner end of said guide tube and having an axially inner end projecting through said washer and defining an externally threaded connecting portion, said nut being threaded to said connecting portion to bear forcibly against an inner distal end of said flange and urge said washer axially outwardly against said inner end of the frame, and thereby urge said outer end of the frame axially outwardly against said adapter boss to lock the structure in coaxially assembled relationship; and an outer housing encapsulating the frame and retaining said washer in association with said frame inner end wall.

2. The valve structure of claim 1 wherein said housing comprises a housing molded of synthetic resin encapsulating said frame with said washer flange exposed.

3. The valve structure of claim 1 wherein said coil defines a length and said plug means extends within said coil substantially one-half the length of the coil.

4. The valve structure of claim 1 wherein said assembled structure is readily disassembled upon threaded removal of said nut.

5. The valve structure of claim 1 wherein a set synthetic resin is provided in said frame.

6. The valve structure of claim 1 wherein said housing comprises a parallelepiped housing.

7. The valve structure of claim 1 wherein said frame and housing are parallelepiped shaped.

8. The valve structure of claim 1 wherein the inner diameters of the coil, frame, and washer are larger than the outer diameters of the guide tube and plug, whereby free axial movement of the coil, frame, and washer as an assembly may be effected by said nut engaging said washer flange.

* * * * *